(12) United States Patent
Abe et al.

(10) Patent No.: US 12,173,205 B2
(45) Date of Patent: Dec. 24, 2024

(54) ADHESIVE SHEET AND METHOD FOR APPLYING ADHESIVE SHEET TO ROUGH SURFACE

(71) Applicant: 3M INNOVATIVE PROPERTIES COMPANY, St. Paul, MN (US)

(72) Inventors: Hidetoshi Abe, Yamagata (JP); Katsuya Ono, Yamagata (JP)

(73) Assignee: 3M Innovative Properties Company, St. Paul, MN (US)

( * ) Notice: Subject to any disclaimer, the term of this patent is extended or adjusted under 35 U.S.C. 154(b) by 630 days.

(21) Appl. No.: 17/413,731

(22) PCT Filed: Dec. 19, 2019

(86) PCT No.: PCT/IB2019/061132
§ 371 (c)(1),
(2) Date: Jun. 14, 2021

(87) PCT Pub. No.: WO2020/128973
PCT Pub. Date: Jun. 25, 2020

(65) Prior Publication Data
US 2022/0064493 A1  Mar. 3, 2022

(30) Foreign Application Priority Data
Dec. 21, 2018 (JP) .................. 2018-239528

(51) Int. Cl.
*C09J 7/38* (2018.01)
*C09J 7/25* (2018.01)
*C09J 7/28* (2018.01)
*C09J 7/40* (2018.01)

(52) U.S. Cl.
CPC .............. *C09J 7/385* (2018.01); *C09J 7/255* (2018.01); *C09J 7/28* (2018.01); *C09J 7/403* (2018.01);
(Continued)

(58) Field of Classification Search
CPC ..... C09J 7/385; C09J 7/255; C09J 7/28; C09J 7/403; C09J 2400/163; C09J 2423/045;
(Continued)

(56) References Cited

U.S. PATENT DOCUMENTS 5,607,763 A   3/1997  Matsuda
6,015,606 A   1/2000  Abe
(Continued)

FOREIGN PATENT DOCUMENTS

JP    H09-157606    6/1997
JP    2002-169470   6/2002
(Continued)

OTHER PUBLICATIONS

Fox, Influence of Diluent and of Copolymer Composition on the Glass Temperature, Bulletin of the American Physical Society, Jan. 1956, vol. 1, No. 1, p. 123.
(Continued)

*Primary Examiner* — Patricia L. Nordmeyer
(74) *Attorney, Agent, or Firm* — Julie Lapos-Kuchar; Vincent L. Pham

(57) ABSTRACT

Adhesive sheets that can adhere to both a smooth surface and a rough surface with sufficient adhesive force and that exhibits smooth visual appearance after adhesion regardless of a surface to be applied are described. In particular, adhesive sheets including a rigid sheet having a thickness of 80 μm or greater and 2 mm or less; and a first pressure-sensitive adhesive layer disposed on one surface of the rigid sheet, the first pressure-sensitive adhesive layer having a thickness of 40 μm or greater and 1.2 mm or less and including a microstructured surface including irregularities are described.

16 Claims, 3 Drawing Sheets

(52) U.S. Cl.
CPC .... *C09J 2400/163* (2013.01); *C09J 2423/045* (2013.01); *C09J 2433/00* (2013.01); *C09J 2467/005* (2013.01); *C09J 2467/006* (2013.01); *Y10T 428/14* (2015.01); *Y10T 428/1476* (2015.01); *Y10T 428/2848* (2015.01); *Y10T 428/2891* (2015.01)

(58) Field of Classification Search
CPC .............. C09J 2433/00; C09J 2467/005; C09J 2467/006; C09J 133/06; C09J 133/26; C09J 135/00; C09J 2203/346; C09J 2301/124; C09J 2301/312; C09J 7/29; C09J 7/38; Y10T 428/14; Y10T 428/1476; Y10T 428/2848; Y10T 428/2891
See application file for complete search history.

(56) References Cited

U.S. PATENT DOCUMENTS

| | | | |
|---|---|---|---|
| 9,085,121 B2* | 7/2015 | Mikami | ................... B32B 3/30 |
| 2006/0172104 A1 | 8/2006 | Lim | |
| 2008/0311369 A1* | 12/2008 | Yokoyama | ................ B32B 7/12 |
| | | | 428/354 |
| 2010/0196669 A1 | 8/2010 | Hatakenaka | |
| 2013/0004749 A1* | 1/2013 | Hao | ........................ B32B 29/00 |
| | | | 428/206 |
| 2018/0222173 A1 | 8/2018 | Mikami | |
| 2021/0009863 A1 | 1/2021 | Abe | |

FOREIGN PATENT DOCUMENTS

| | | |
|---|---|---|
| JP | 2008-231215 | 10/2008 |
| JP | 2010-228179 | 10/2010 |
| JP | 5316528 | 10/2013 |
| JP | 5933957 | 6/2016 |
| JP | 2017-113980 | 6/2017 |
| JP | 2017-197604 | 11/2017 |
| WO | WO 2018-189626 | 10/2018 |

OTHER PUBLICATIONS

International Search Report for PCT International Application No. PCT/IB2019/061132, mailed on Apr. 14, 2020, 4 pages.

* cited by examiner

ADHESIVE SHEET AND METHOD FOR APPLYING ADHESIVE SHEET TO ROUGH SURFACE

CROSS REFERENCE TO RELATED APPLICATIONS

This application is a national stage filing under 35 U.S.C. 371 of PCT/IB2019/061132, filed Dec. 19, 2019, which claims the benefit of JP Application No. 2018-239528, filed Dec. 21, 2018, the disclosure of which is incorporated by reference in its/their entirety herein.

TECHNICAL FIELD

The present disclosure relates to an adhesive sheet and a method for applying an adhesive sheet to a rough surface.

BACKGROUND ART

An adhesive sheet is used in various kinds of application. For example, an adhesive graphic sheet including a graphic image is used for exterior and interior decoration or advertising purposes. A general adhesive sheet applied to a substrate surface having an irregular shape has flexibility that enables the adhesive sheet to follow a shape of the substrate surface to achieve good adhesion.

Patent Document 1 (JP 6-287525 A) describes "a decorative adhesive film formed by applying an adhesive to a surface of a film substrate, wherein hardness of the film ranges from H to 3B in a pencil scratch test in accordance with JISK5400, and the adhesive contains an adhesive microsphere having an elastic modulus of $1 \times 10^4$ to $1 \times 10^6$ dyn/cm$^2$.

Patent Document 2 (JP 9-157606 A) describes "an adhesive sheet comprising: I) a support; and II) an adhesive layer formed on the support and including an adhesive microsphere and an adhesive polymer, wherein a) the adhesive layer includes a convex adhesive part containing a cluster formed by aggregation of at least two adhesive microspheres and the adhesive polymer, and b) as measured by pasting the adhesive sheet to a flat glass plate surface at a pressure of 1 kg/cm, the adhesive sheet has an area contact rate between the adhesive layer and the plate surface from 20 to 90%."

Patent Document 3 (JP 8-113768 A) describes "a decorative adhesive film formed by applying an adhesive to a surface of a film substrate, wherein the adhesive includes a microsphere having an elastic modulus from $1 \times 10^4$ to $1 \times 10^7$ dyn/cm$^2$ and a particle size from 10 to 100 μm (as a volume average diameter).

SUMMARY OF INVENTION

Technical Problem

There is a need for an adhesive sheet that exhibits smooth visual appearance even after adhesion to a rough surface such as mortar, concrete, a siding board, stucco, or embossed wallpaper. Moreover, it is desirable that the adhesive sheet have sufficient adhesive force not only to these rough surfaces but also to a smooth surface such as a metal plate and a resin film. For example, when such an adhesive sheet is used as a graphic sheet, the graphic sheet can be placed in various surfaces while quality of a graphic image is maintained.

The present disclosure provides an adhesive sheet that can adhere to both a smooth surface and a rough surface with sufficient adhesive force and that exhibits smooth visual appearance after adhesion regardless of a surface to be applied.

Solution to Problem

According to an embodiment, there is provided an adhesive sheet including: a rigid sheet having a thickness of 80 μm or more and 2 mm or less; and a first pressure-sensitive adhesive layer disposed on one surface of the rigid sheet, the first pressure-sensitive adhesive layer having a thickness of 40 μm or greater and 1.2 mm or less and including a microstructured surface including irregularities.

According to another embodiment, there is provided a method for applying an adhesive sheet to a rough surface, the method including: providing an adhesive sheet including: a rigid sheet having a thickness of 80 μm or greater and 2 mm or less; and a first pressure-sensitive adhesive layer disposed on one surface of the rigid sheet, the first pressure-sensitive adhesive layer having a thickness of 40 μm or greater and 1.2 mm or less and including a microstructured surface including irregularities; and applying the adhesive sheet to a rough surface, wherein the adhesive sheet exhibits smooth visual appearance after the adhesive sheet is applied to the rough surface.

Advantageous Effects of Invention

An adhesive sheet of the present disclosure includes, in combination, a first pressure-sensitive adhesive layer having a predetermined thickness and including a microstructured surface including irregularities, and a rigid sheet having a predetermined thickness, and thus the adhesive sheet can have sufficient adhesive force to both a smooth surface and a rough surface and exhibit smooth visual appearance after adhesion regardless of a surface to be applied.

Note that the above description should not be construed to mean that all embodiments of the present invention and all advantages related to the present invention are disclosed.

DESCRIPTION OF EMBODIMENTS

Detailed description will be given for the purpose of exemplifying representative embodiments of the present invention, but the present invention is not limited to these embodiments.

In the present disclosure, "(meth)acrylic" means acrylic or methacrylic, and "(meth)acrylate" means acrylate or methacrylate.

In the present disclosure, "pressure-sensitive adhesion" means a property of a material or a composition permanently having adhesiveness within the range of an operation temperature, for example, within the range from 0° C. to 50° C., and adhering to various surfaces under slight pressure without exhibiting phase transition (from liquid to solid).

In the present disclosure, "disposed on" includes not only the case of being directly disposed on but also the case of being indirectly disposed on.

An adhesive sheet according to an embodiment includes: a rigid sheet having a thickness of 80 μm or greater and 2 mm or less; and a first pressure-sensitive adhesive layer disposed on one surface of the rigid sheet, the first pressure-sensitive adhesive layer having a thickness of 40 μm or greater and 1.2 mm or less and including a microstructured surface including irregularities. The adhesive sheet is caused to adhere to an adherend by bringing the microstructured surface including irregularities of the first pressure-sensitive adhesive layer into contact with an adherend surface and applying pressure as necessary.

Figure 1:
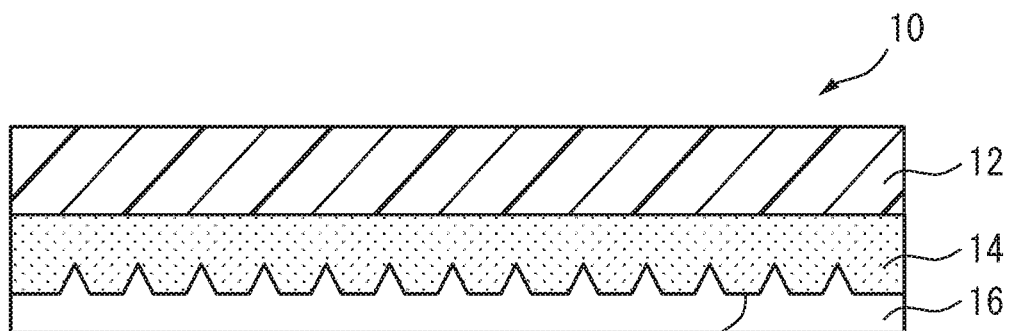
FIG. 1 is a schematic cross-sectional view of an adhesive sheet according to an embodiment.

FIG. 1 illustrates a schematic cross-sectional view of an adhesive sheet 10 according to an embodiment. The adhesive sheet 10 includes a rigid sheet 12 and a first pressure-sensitive adhesive layer 14 disposed on one surface (lower surface in FIG. 1) of the rigid sheet 12. The first pressure-sensitive adhesive layer 14 includes a microstructured surface 142 including irregularities. FIG. 1 illustrates a liner 16 including a microstructured surface complementary to the microstructured surface 142 of the first pressure-sensitive adhesive layer 14 on the first pressure-sensitive adhesive layer 14 (lower surface in FIG. 1) as an optional constituent.

The first pressure-sensitive adhesive layer may be disposed directly on the rigid sheet or may be disposed indirectly on the rigid sheet, that is, may be disposed on another layer, for example, a decorative layer such as a printed layer and a metal vapor-deposited layer, a metal layer, or an additional resin film layer disposed on the rigid sheet.

The rigid sheet functions as a support for the first pressure-sensitive adhesive layer, and resists stress caused by deformation of irregularities in the microstructured surface of the first pressure-sensitive adhesive layer at the time of application of the adhesive sheet, to prevent deformation of the adhesive sheet, and, as a result, contributes to keeping visual appearance of the adhesive sheet smooth. When an adherend includes an irregular surface, the rigid sheet can suppress the adhesive sheet excessively following the irregular surface at the time of adhesion, and prevent a protrusion in the irregular surface from penetrating the adhesive sheet. When the adhesive sheet is applied to a vertical surface, the rigid sheet can suppress deformation of the adhesive sheet and prevent peeling due to its own weight.

The thickness of the rigid sheet is about 80 μm or greater and about 2 mm or less. In some embodiments, the rigid sheet has a thickness of about 100 μm or greater or about 150 μm or greater, and about 1 mm or less or about 500 μm or less. The thickness of the rigid sheet is set within the above-described range, and thus, in combination with the rigidity of the sheet itself, smoothness of visual appearance of the adhesive sheet can be maintained at the time of adhesion. When the thickness of the rigid sheet is different in a plane, the thickness of the rigid sheet in the present disclosure refers to the minimum thickness of the rigid sheet.

In some embodiments, a yield elastic modulus of the rigid sheet is about 10 MPa or greater, about 15 MPa or greater, or about 20 MPa or greater, and about 300 MPa or less, about 250 MPa or less, or about 200 MPa or less. The yield elastic modulus of the rigid sheet is set within the above-described range, and thus, in combination with the thickness of the rigid sheet, smoothness of visual appearance of the adhesive sheet can be maintained at the time of adhesion. The yield elastic modulus is defined as an elastic modulus at a yield point obtained by cutting the rigid sheet into a rectangle having a width of 15 mm and a length of 100 mm to prepare a test piece and measuring an elongation characteristic of the test piece in accordance with JIS K 7127: 1999 by using a tensile tester under conditions of: 20° C., a gripping interval of 50 mm and a tensile speed of 300 mm/min.

In some embodiments, a product of the yield elastic modulus and the thickness of the rigid sheet is about $0.9 \times 10^4$ N/m or greater, about $1.0 \times 10^4$ N/m or greater, or about $1.5 \times 10^4$ N/m or greater, and about $5 \times 10^4$ N/m or less, about $4 \times 10^4$ N/m or less, or about $3 \times 10^4$ N/m or less. The product of the yield elastic modulus and the thickness is proportional to the bending rigidity of the rigid sheet. The product of the yield elastic modulus and the thickness of the rigid sheet is set within the above-described range, and thus, the rigid sheet can have bending rigidity sufficient for maintaining smoothness of visual appearance of the adhesive sheet at the time of adhesion.

In some embodiments, 2% tensile strength of the rigid sheet is about 40 N/25 mm or greater, about 45 N/25 mm or greater, or about 50 N/25 mm or greater. The 2% tensile strength of the rigid sheet is set within the above-described range, and thus, smoothness of visual appearance of the adhesive sheet can be maintained at the time of adhesion, and the adhesive sheet can be removed without causing breakage or destruction of the adhesive sheet and without causing an adhesive residue involved with breakage or destruction of the adhesive sheet. The 2% tensile strength is defined as tensile strength at 2% elongation obtained by cutting the rigid sheet into a rectangle having a width of 25 mm and a length of 100 mm to prepare a test piece, and measuring by using a tensile tester under conditions of 20° C., a gripping interval of 50 mm, and a tensile speed of 300 mm/min.

A material for the rigid sheet is not particularly limited, and examples of the material include a film including a resin such as a polyester such as polyethylene terephthalate and polyethylene naphthalate, a polyolefin such as polyethylene and polypropylene, polycarbonate, an acrylic resin and a fluororesin such as polytetrafluoroethylene and polyvinylidene fluoride; paper such as fine paper, coated paper, and impregnated paper including various materials such as diatomaceous earth; and laminated paper obtained by laminating the resin in these kinds of paper. Since a polyester film has a high yield elastic modulus and strength, is excellent in weather resistance, and is relatively inexpensive, it is advantageous to use the polyester film as the rigid sheet.

The rigid sheet may be subjected to surface treatment such as embossing treatment, primer treatment, corona treatment, and plasma treatment for the purpose of decoration or the like. The surface treatment is performed, and thus close adhesion between the first pressure-sensitive adhesive layer and/or a second pressure-sensitive adhesive layer and the rigid sheet can be enhanced.

The rigid sheet may be a stretched film or may be a non-stretched film. When the rigid sheet is a stretched film, particularly a biaxially stretched film, the rigidity and the tensile strength of the film can be enhanced advantageously.

The rigid sheet may include other optional components such as a filler, a colorant, an ultraviolet absorber, and an antioxidant.

The first pressure-sensitive adhesive layer includes a microstructured surface including irregularities. The microstructured surface including irregularities opposes an adherend surface as an adhesive surface. At the time of adhesion of the adhesive sheet, a convex part of the microstructured surface deforms to cause compression, for example, in the thickness direction of the adhesive sheet, and thus, contact area of the first pressure-sensitive adhesive layer with an adherend surface increases, and the adhesive sheet adheres to the adherend surface. The microstructured surface including irregularities can have increased contact area with a rough surface by utilizing a difference in the height between a convex part and a concave part, and thus adhesive force to the rough surface can also be enhanced.

The thickness of the first pressure-sensitive adhesive layer is about 40 μm or greater and about 1.2 mm or less. In some embodiments, the thickness of the first pressure-sensitive adhesive layer is about 100 μm or greater or about 150 μm or greater, and about 1 mm or less or about 500 μm or less. The thickness of the first pressure-sensitive adhesive layer is set to about 40 μm or greater, and thus, sufficient adhesive force to any of a smooth surface and a rough surface can be obtained. The thickness of the first pressure-sensitive adhesive layer is set to about 1.2 mm or less, and thus, it is possible to prevent or suppress the first pressure-sensitive adhesive layer excessively following irregularities of a rough surface to reduce smoothness of visual appearance of the adhesive sheet. In the present disclosure, the thickness of the first pressure-sensitive adhesive layer refers to the maximum thickness of the first pressure-sensitive adhesive layer.

In some embodiments, a shear storage elastic modulus G' at 25° C. of the first pressure-sensitive adhesive layer is about $5\times10^4$ Pa or greater, about $1\times10^5$ Pa or greater, or about $2\times10^5$ Pa or greater, and about $1\times10^6$ Pa or less, about $8\times10^5$ Pa or less, or about $6\times10^5$ Pa or less. The shear storage elastic modulus G' of the first pressure-sensitive adhesive layer is set within the above-described range, and thus, adhesive force of the first pressure-sensitive adhesive layer and a shape of the microstructured surface can be maintained to be suitable for both a rough surface and a smooth surface. The shear storage elastic modulus G' is a value at 25° C. as measured in a shear mode at a measurement temperature ranging from −80° C. to 150° C., at a heating rate of 5.0° C./min, and at a frequency of 1.0 Hz. The shear storage elastic modulus G' can be measured by using, for example, a dynamic viscoelasticity measuring device ARES of TA Instruments Japan Inc. (Shinagawa-ku, Tokyo, Japan).

The first pressure-sensitive adhesive layer includes an adhesive. An adhesive including a resin such as an acrylic resin, a polyurethane, a polyolefin, a polyester, a rubber resin, a silicone resin, and a vinyl acetate resin can be used as the adhesive. The adhesive may include a tackifier and may be crosslinked. "Adhesion (adhesive)" in the present disclosure means a property of a material that exhibits adhesiveness only by applying a slight pressure at room temperature for a short time, and is used interchangeably with "pressure-sensitive adhesion."

In an embodiment, the adhesive is an acrylic adhesive. Since the acrylic adhesive has excellent adhesion performance and weather resistance, and is easy to modify, adhesive properties can be adjusted according to the type of a material for an adherend and surface conditions such as surface roughness of an adherend, and the presence or absence of primer treatment.

The acrylic adhesive includes an adhesive acrylic polymer. In some embodiments, the acrylic adhesive includes an adhesive acrylic polymer that is a polymer of a monomer composition including one or more monomers selected from the group consisting of: alkyl (meth) acrylate such as methyl (meth) acrylate, ethyl (meth) acrylate, n-butyl (meth) acrylate, isoamyl (meth) acrylate, 2-methylbutyl (meth) acrylate, n-hexyl (meth) acrylate, 2-ethylhexyl (meth) acrylate, isooctyl (meth) acrylate, isononyl (meth) acrylate, decyl (meth) acrylate, dodecyl (meth) acrylate, cyclohexyl (meth) acrylate, and isobornyl (meth) acrylate; phenoxyalkyl (meth) acrylate such as phenoxyethyl (meth) acrylate; alkoxyalkyl (meth) acrylate such as methoxypropyl (meth) acrylate, and 2-methoxybutyl (meth) acrylate; cyclic ether-containing (meth) acrylate such as glycidyl (meth) acrylate and tetrahydrofurfuryl (meth) acrylate; a hydroxyl group-containing monomer such as 2-hydroxyethyl (meth) acrylate, 2-hydroxypropyl (meth) acrylate, and 4-hydroxybutyl (meth) acrylate; a carboxyl group-containing monomer such as (meth) acrylic acid, crotonic acid, itaconic acid, fumaric acid, citraconic acid, and maleic acid; and (meth) acrylamide.

The alkyl (meth) acrylate constitutes a main component of the adhesive acrylic polymer. In some embodiments, a blending amount of the alkyl (meth) acrylate is about 50 parts by mass or greater, about 70 parts by mass or greater, or about 80 parts by mass or greater, and about 99.5 parts by mass or less, about 99 parts by mass or less, or about 98 parts by mass or less based on 100 parts by mass of a polymerizable component of the monomer composition. The "polymerizable component" in the present disclosure means a component that can be polymerized by radical polymerization described below. The "polymerizable component," as used in terms of parts by mass, means total mass of these components.

The hydroxyl group-containing monomer, the carboxyl group-containing monomer, and the (meth) acrylamide are a polar monomer including a functional group having relatively high polarity in a molecule. The polar monomer is known to impart high cohesive strength to the adhesive acrylic polymer and/or to enhance interaction between the adhesive acrylic polymer and a substrate surface. In some embodiments, a blending amount of the polar monomer is about 0.1 parts by mass or greater, about 0.5 parts by mass or greater, or about 1 part by mass or greater, and about 10 parts by mass or less, about 5 parts by mass or less, or about 3 parts by mass or less, based on 100 parts by mass of the polymerizable component of the monomer composition.

The adhesive acrylic polymer can be obtained by polymerizing the above-described monomer composition by using an ordinary radical polymerization method such as solution polymerization, suspension polymerization, emulsion polymerization, and bulk polymerization. An organic peroxide such as benzoyl peroxide, lauroyl peroxide, and bis(4-tert-butylcyclohexyl) peroxydicarbonate, and an azo-based polymerization initiator such as 2,2'-azobisisobutyronitrile, 2,2'-azobis(2-methylbutyronitrile), dimethyl-2,2-azobis(2-methylpropionate), 4,4'-azobis(4-cyanovaleric acid), 2,2'-azobis(2-methylpropionic acid) dimethyl, and azobis(2,4-dimethylvaleronitrile) (AVN), and the like can be used as a polymerization initiator. A use amount of the polymerization initiator can be generally about 0.01 parts by mass or greater or about 0.05 parts by mass or greater, and about 5 parts by mass or less or about 3 parts by mass or less, based on 100 parts by mass of the polymerizable component of the monomer composition.

In some embodiments, a weight average molecular weight of the adhesive acrylic polymer is about 100000 or greater or about 200000 or greater, and about 1000000 or less or about 700000 or less. The weight average molecular weight of the adhesive acrylic polymer is determined by using a gel permeation chromatography (GPC) method calibrated with a polystyrene standard.

The adhesive acrylic polymer may be crosslinked with a crosslinking agent. As the crosslinking agent, an epoxy compound such as N,N,N',N'-tetraglycidyl-1,3-benzene di(methanamine), an isocyanate compound, a melamine compound, a poly (meth) acrylate compound, an amide compound, a bisamide compound, a dibasic acid bisaziridine derivative such as 1,1'-isophthaloyl-bis(2-methylaziridine), and the like can be used. As the crosslinking agent, it is preferable to use an epoxy compound, particularly N,N,N', N'-tetraglycidyl-1,3-benzene di(methanamine). An addition amount of the crosslinking agent can be generally about 0.1 parts by mass or more or about 0.2 parts by mass or greater, and about 10 parts by mass or less or about 5 parts by mass or less, based on 100 parts by mass of the adhesive acrylic polymer, depending on the type of the crosslinking agent. The crosslinking agent is adjusted within this range to increase crosslinking density, and thus, cohesive force of the first pressure-sensitive adhesive layer can be enhanced to maintain adhesive force of the first pressure-sensitive adhesive layer and a shape of the microstructured surface suitable for both a rough surface and a smooth surface.

A glass transition temperature Tg of the adhesive acrylic polymer is, for example, about −65° C. or higher, about −60° C. or higher, or about −50° C. or higher, and about 25° C. or lower, about 0° C. or lower, or about −10° C. or lower. The glass transition temperature of the adhesive acrylic polymer is adjusted within the above-described range, and thus, adhesive force of the first pressure-sensitive adhesive layer can be adjusted to impart both adhesive force necessary for the first pressure-sensitive adhesive layer and a shape-retaining property of the microstructured surface. The glass transition temperature Tg (° C.) of the adhesive acrylic polymer can be determined by the following FOX equation, assuming that the adhesive acrylic polymer is obtained by copolymerization of n types of monomers:

$$\frac{1}{Tg + 273.15} = \sum_{i=1}^{n} \left( \frac{X_i}{Tg_i + 273.15} \right)$$ [Equation 1]

(Fox, T. G., Bull. Am. Phys. Soc., 1 (1956), p. 123). In the equation, Tg represents a glass transition temperature (° C.) of a homopolymer of a component i; $X_i$ represents a mass fraction of a monomer of the component i added during polymerization; i is a natural number of 1 to n; and holds.

$$\sum_{i=1}^{n} X_i = 1$$ [Equation 2]

The microstructured surface including irregularities of the first pressure-sensitive adhesive layer can include a convex part and a concave part surrounding the convex part. An example of a method for forming such a microstructured surface in the first pressure-sensitive adhesive layer will be described below, but the method is not limited to this example.

A liner including a release surface including a predetermined irregular structure is prepared. An adhesive for forming the first pressure-sensitive adhesive layer of the adhesive sheet is applied to the release surface of the liner, and dried, heated and/or irradiated with radiation as necessary to form the first pressure-sensitive adhesive layer. Thus, the irregular structure (negative structure) of the liner is transferred to a surface being in contact with the liner of the first pressure-sensitive adhesive layer (this surface becomes an adhesive surface of the adhesive sheet) to form a microstructured surface including a predetermined irregular structure (positive structure) in the first pressure-sensitive adhesive layer. Accordingly, according to this method, the microstructured surface of the first pressure-sensitive adhesive layer and the microstructured surface of the liner are complementary to each other.

During an operation of pasting the adhesive sheet to an adherend, the irregularities in the microstructured surface deform by pressure, and thus, an adhesive convex part deforms into a shape suitable for adhering to an adherend surface. Degree of the deformation can be controlled by the thickness of the first pressure-sensitive adhesive layer, shapes, sizes and arrangement of the convex part and the concave part of the microstructured surface, and the shear storage elastic modulus G' of an adhesive, such that when the first pressure-sensitive adhesive layer is brought into contact with an adherend, contact area between the convex and concave parts and an adherend surface increases.

The microstructured surface can include convex parts having various shapes. Examples of the shape of the convex part include a cylinder, an elliptic cylinder, a prism, a hemisphere, a semi-elliptical sphere, a cone, a pyramid, a truncated cone, and a truncated pyramid. The microstructured surface may include a combination of convex parts having a plurality of types of shapes. A cross-sectional shape of a base of the convex part may be different from a cross-sectional shape of a top. For example, a cross section of the top may be a circular shape, whereas a cross section of the base may be a square shape. Cross-sectional area of the base of the convex part is usually larger than cross-sectional area of the top of the convex part. The bases of the convex parts may be in contact with each other or alternately, and the bases of the adjacent convex parts may be separated from each other by a predetermined distance.

In some embodiments, the cross-sectional area of the base of the convex part is about 10000 $\mu m^2$ or greater, about 20000 $\mu m^2$ or greater, or about 30000 $\mu m^2$ or greater, and about 5 $mm^2$ or less, about 4 $mm^2$ or less, about 3 $mm^2$ or less. The cross-sectional area of the base of the convex part is set within the above-described range, and thus, the adhesive sheet can adhere to a rough surface with high adhesive force.

In an embodiment, the top of the convex part may have a flat surface. Examples of a shape of the convex part having a flat surface at the top include a cylinder, an elliptical cylinder, a prism, a truncated cone, and a truncated pyramid. The adhesive sheet in which the convex parts having these shapes are provided in the microstructured surface of the first pressure-sensitive adhesive layer can adhere to a smooth surface with high adhesive force.

In some embodiments, total cross-sectional area of the tops of the convex parts is about 30% or greater, about 50% or greater, or about 70% or greater, and about 99% or less, about 95% or less, or about 90% or less of flat surface area of the first pressure-sensitive adhesive layer. The total cross-sectional area of the tops of the convex parts is set within the above-described range, and thus, both adhesive force to a smooth surface and adhesive force to a rough surface can be balanced within an advantageous range. In the present disclosure, the "flat surface area" means area determined from the flat surface shape of the first pressure-sensitive adhesive layer as viewed along the thickness direction of the first pressure-sensitive adhesive layer.

A difference in the height between the convex part and the concave part in the structured surface of the first pressure-sensitive adhesive layer is one of indices indicating topography (a shape or a characteristic of a surface) of an irregular surface of the first pressure-sensitive adhesive layer, and is particularly related to adhesiveness to a rough surface. In some embodiments, the difference in the height between the convex part and the concave part in the structured surface of the first pressure-sensitive adhesive layer is about 10 μm or more, about 40 μm or more, or about 80 μm or more, and about 400 μm or less, about 350 μm or less, or about 300 μm or less. The difference in the height between the convex part and the concave part in the structured surface of the first pressure-sensitive adhesive layer is set within the above-described range, and thus, the adhesive sheet can adhere to, for example, a rough surface including a protrusion having a height from 1 to 2 mm.

In an embodiment, a gap in the microstructured surface of the first pressure-sensitive adhesive layer has a shape and a depth suitable for air release, and the adhesive sheet can be placed easily in a smooth surface.

The convex part and the concave part in the microstructured surface may form a communication path. The microstructured surface of the first pressure-sensitive adhesive layer may include, for example, a communication path of a regular pattern in which grooves having a constant shape are formed to be disposed in a regular pattern, or may include a communication path of an irregular pattern in which grooves having no regular shape are formed to be disposed.

The communication path may extend to an outer edge of the adhesive layer. In this embodiment, when the adhesive sheet is pasted to an adherend, air sandwiched between a first pressure-sensitive adhesive layer surface and an adherend surface is discharged to the outside through the communication path, and thus, it is possible to suppress or prevent contamination of observable bubbles at an interface between the adhesive sheet and the adherend.

When a plurality of the communication paths are formed to be disposed substantially parallel to each other, an interval between the communication paths can be generally about 10 μm or greater, about 20 μm or greater, or about 50 μm or greater, and about 2 mm or less, about 1 mm or less, or about 500 μm or less.

The width of each communication path (maximum width as viewed in the thickness direction of the first pressure-sensitive adhesive layer) can be generally about 5 μm or greater, about 10 μm or greater, or about 20 μm or greater, and about 100 μm or less, about 80 μm or less, or about 50 μm or less.

The depth of the communication path (distance from the top of the convex part adjacent to the communication path to a bottom of the communication path as measured along the thickness direction of the first pressure-sensitive adhesive layer) can be generally about 10 μm or greater, about 40 μm or greater, or about 80 μm or greater, and about 400 μm or less, about 350 μm or less, or about 300 μm or less. In an embodiment, the bottom of the communication path also includes an adhesive surface, that is, the first pressure-sensitive adhesive layer is not divided by the communication path.

The first pressure-sensitive adhesive layer may include other optional components such as a filler, a colorant, an ultraviolet absorber, an antioxidant, and the like. These optional components can be dissolved or dispersed in an adhesive. In an embodiment, the first pressure-sensitive adhesive layer includes a white pigment such as titanium oxide. In this embodiment, an adherend surface can be shielded.

The adhesive sheet can be applied to an adherend surface by a known method. At the time of application, the adhesive sheet may be pressed against an adherend surface with a roller or the like, or may be rubbed by hand. Although the adhesive sheet may deform once at the time of application, the shape of the adhesive sheet is restored over time, and thus, it is possible to provide a smooth surface. In an embodiment, the adhesive sheet is applied to a rough surface such as mortar, and concrete, and exhibits smooth visual appearance after the application. Further, a sealing tape may be applied to cover a peripheral part of the adhesive sheet applied to a rough surface and to cover at least a part of the rough surface. The sealing tape is applied from above the adhesive sheet in this way, and thus, it is possible to prevent moisture or the like from entering from a gap between an end of the adhesive sheet and a rough surface, and it is possible to suppress deformation of the adhesive sheet due to internal stress that can remain in the adhesive sheet at the time of application to a rough surface.

Adhesive force of the adhesive sheet varies depending on an adherend surface, and, as expressed by 180° peel force, is, for example, about 0.5 N/25 mm or greater or about 1 N/25 mm or greater, and about 50 N/25 mm or less or about 25 N/25 mm or less. Since the adhesive sheet includes the rigid sheet, the adhesive sheet is difficult to deform in a bending direction, and force necessary for starting peeling of the adhesive sheet does not concentrate at a peeling start position. Therefore, when the 180° peel force is small, the adhesive sheet can be held in an adherend surface. The 180° peel force is defined as adhesive force obtained by cutting the adhesive sheet into a rectangle having a width of 25 mm and a length of 150 mm to prepare a test piece, pasting the test piece onto an adherend surface at 20° C. in accordance with JIS Z 0237: 2009, and subsequently, leaving the test piece at 20° C. for 24 hours and performing 180° peeling at 20° C. and a peeling speed of 300 mm/min by using a tensile tester.

Shearing force in a structure in which the adhesive sheet and an adherend are bonded varies depending on an adherend surface, and is, for example, about 0.05 MPa or greater or about 0.10 MPa or greater, and about 1.5 MPa or less or about 1.0 MPa or less. The adhesive sheet can exhibit high shearing force particularly when the adhesive sheet is applied to a rough surface. Without being bound by any theory, this is considered to be because the microstructured surface including irregularities of the first pressure-sensitive adhesive layer meshes with irregularities of a rough surface. High shearing force is advantageous for preventing the adhesive sheet from shifting due to its own weight when the adhesive sheet is applied to a vertical surface. The shearing force is defined as adhesive force obtained by cutting the adhesive sheet into a rectangle having a width of 25 mm and a length of 60 mm to prepare a test piece, pasting the test piece onto an aluminum panel having a width of 25 mm, a length of 60 mm and a thickness of 1 mm at 23° C. by using a roller such that contact area is 25 mm×12 mm, and subsequently, leaving the test piece at 20° C. for 24 hours, and measuring by using a tensile tester at 20° C. and a tensile speed of 50 mm/min.

The adhesive sheet of an embodiment has rearrangeability. The first pressure-sensitive adhesive layer including the microstructured surface including irregularities can impart rearrangeability to the adhesive sheet.

The adhesive sheet may further include an optional constituent, for example, a surface protective layer provided on one surface or the other surface of the rigid sheet, and a decorative layer such as a printed layer and a metal vapor-deposited layer, an adhesive layer for adhesion of these layers, or an additional resin film layer.

In an embodiment, the adhesive sheet includes a transparent resin film, and the transparent resin film includes a graphic image printed in a surface of the transparent resin film.

The rigid sheet may include a second pressure-sensitive adhesive layer in the other surface. The rigid sheet and the transparent resin film or another layer such as a metal layer can adhere to each other by the second pressure-sensitive adhesive layer. The graphic image may be located between the transparent resin film and the second pressure-sensitive adhesive layer. Thus, the graphic image can be protected by the transparent resin film.

Figure 2:
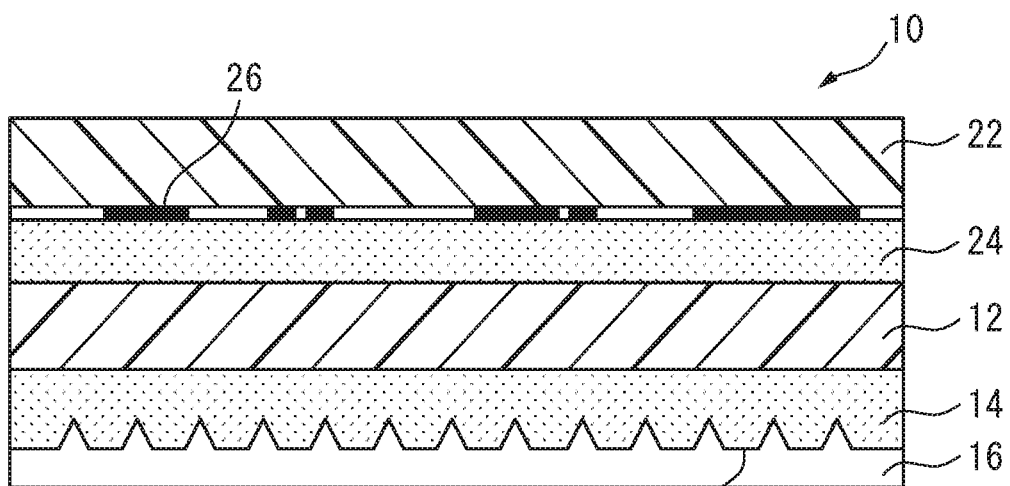
FIG. 2 is a schematic cross-sectional view of an adhesive sheet according to another embodiment.

FIG. 2 illustrates a schematic cross-sectional view of an adhesive sheet 10 according to another embodiment of the present disclosure. The adhesive sheet 10 includes a second pressure-sensitive adhesive layer 24 and a transparent resin film 22, and the second pressure-sensitive adhesive layer 24 and the transparent resin film 22 are disposed on the other surface (upper surface in FIG. 2) of a rigid sheet 12. A graphic image 26 is printed in a surface (lower surface in FIG. 2) of the transparent resin film 22. The graphic image 26 is located between the transparent resin film 22 and the second pressure-sensitive adhesive layer 24.

A material for the transparent resin film is not particularly limited, and examples of the material include polyester such as polyvinyl chloride, polyvinylidene chloride, polyethylene terephthalate, and polyethylene naphthalate, a polyolefin such as polyethylene and polypropylene, a polycarbonate, an acrylic resin, and a fluororesin such as polytetrafluoroethylene and polyvinylidene fluoride. Since an acrylic resin film has excellent weather resistance and transparency, it is advantageous to use the acrylic resin film as the transparent resin film.

The thickness of the transparent resin film may vary, and can be, for example, about 25 µm or greater or about 40 µm or greater, and about 500 µm or less or about 300 µm or less.

The transparent resin film may be subjected to surface treatment such as matt treatment, embossing treatment, primer treatment, corona treatment, and plasma treatment for the purpose of decoration or the like. The transparent resin film may include a receptor layer in a surface of the transparent resin film or may be a receptor film. The transparent resin film including a receptor layer or being a receptor film is used, and thus a graphic image can be formed directly on the transparent resin film by using inkjet printing or the like. The transparent resin film may include other optional components such as a filler, a colorant, an ultraviolet absorber, and an antioxidant.

The transparent resin film may be colorless or may be colored. In some embodiments, a total light transmittance of the transparent resin film is about 85% or greater, or about 90% or greater in the wavelength range from 400 to 700 nm. The total light transmittance in the present disclosure can be determined according to JIS K 7361-1: 1997 (ISO 13468-1: 1996).

A graphic image may be printed in the transparent resin film by using inkjet printing, screen printing, gravure printing, offset printing, electrostatic printing, or the like. As compared with the case of printing in the rigid film, since the transparent resin film is more flexible, handling properties at the time of printing is good.

The second pressure-sensitive adhesive layer can be formed by using a pressure-sensitive adhesive composition containing a known resin such as an acrylic resin, polyurethane, polyolefin, polyester, a rubber resin, a silicone resin, and a vinyl acetate resin. The second pressure-sensitive adhesive layer may include a tackifier and may be crosslinked. In an embodiment, the second pressure-sensitive adhesive layer includes a white pigment such as titanium oxide. In this embodiment, an adherend surface can be shielded.

The thickness of the second pressure-sensitive adhesive layer may vary, and can be, for example, about 10 µm or more, about 20 µm or greater, or about 30 µm or greater, and about 200 µm or less or about 100 µm or less.

Such an adhesive sheet including a graphic image can be produced, for example, by the following procedure. An adhesive sheet having a rigid sheet and a first pressure-sensitive adhesive layer is prepared. Next, as necessary, a surface of the rigid sheet or a surface of any other layer on the rigid sheet is subjected to surface treatment, and a pressure-sensitive adhesive layer composition is applied to these surfaces, followed by drying, and thus, a second pressure-sensitive adhesive layer is formed. A graphic image is printed in one surface of a transparent resin film by using inkjet printing, screen printing, gravure printing, or the like. The transparent resin film and the adhesive sheet are laminated such that a graphic image printing surface of the transparent resin film opposes the second pressure-sensitive adhesive layer. As necessary, a backing may be disposed in a non-printing surface of the transparent resin film, and a release liner may be disposed on the first pressure-sensitive adhesive layer. As necessary, to improve close adhesion between the second pressure-sensitive adhesive layer and the transparent resin film, a surface of the transparent resin film may be subjected to corona treatment, primer treatment, or the like.

The adhesive sheet including a graphic image can also be produced by the following procedure. A second pressure-sensitive adhesive layer is formed on a surface of a rigid sheet, and a release liner is bonded onto the second pressure-sensitive adhesive layer. Next, a first pressure-sensitive adhesive layer is formed in an opposite surface of the rigid sheet, and a release liner is bonded onto the first pressure-sensitive adhesive layer. After the release liner on the second pressure-sensitive adhesive layer is removed, a transparent resin film in which a graphic image is printed is laminated on the second pressure-sensitive adhesive layer.

Figure 3:
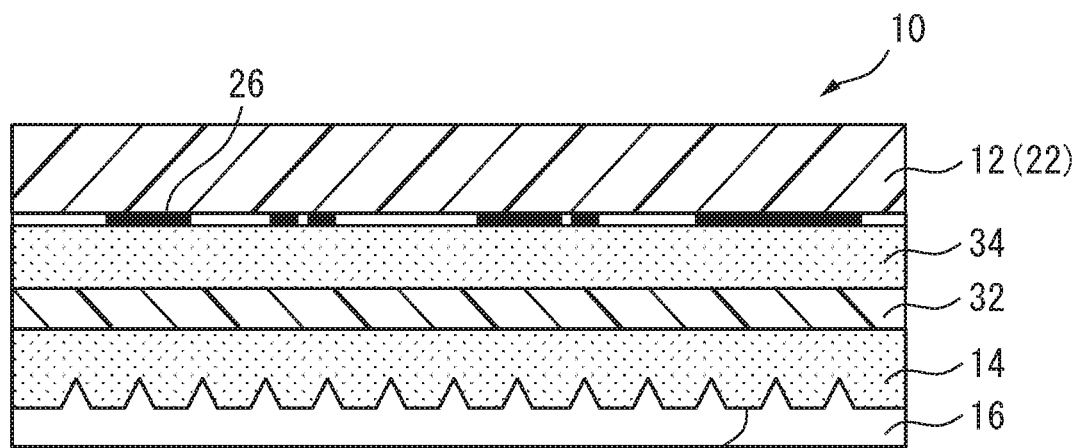
FIG. 3 is a schematic cross-sectional view of an adhesive sheet according to yet another embodiment.

The transparent resin film may be the rigid sheet. FIG. 3 illustrates a schematic cross-sectional view of an adhesive sheet 10 according to yet another embodiment of the present disclosure. The adhesive sheet 10 includes a rigid sheet 12 that is also a transparent resin film 22, a graphic image 26 printed on the rigid sheet 12, an adhesive layer 34, an additional resin film layer 32, and a first pressure-sensitive adhesive layer 14. The adhesive layer 34 may be the same as the second pressure-sensitive adhesive layer, and may include a white pigment such as titanium oxide. Examples of the additional resin film layer include a film made of a polyester such as polyvinyl chloride, polyvinylidene chloride, polyethylene terephthalate, and polyethylene naphthalate, a polyolefin such as polyethylene and polypropylene, a polycarbonate, an acrylic resin, and a fluororesin such as polytetrafluoroethylene and polyvinylidene fluoride, and the thickness of the additional resin film layer may vary, and can be, for example about 25 µm or greater or about 40 µm or greater, and about 500 µm or less or about 300 µm or less. When the total thickness of the transparent resin film and the additional resin film is 80 µm or greater and 500 µm or less, these films may function together as the rigid sheet.

The rigid sheet may include a receptor layer in a surface of the rigid sheet or may be a receptor film. In an embodiment, the receptor layer or the receptor film includes an acrylic resin. The rigid sheet including a receptor layer or being a receptor film is used, and thus, a graphic image can be formed directly on the rigid sheet by using inkjet printing or the like. The receptor layer may be laminated in the rigid sheet via the adhesive layer.

Figure 4:
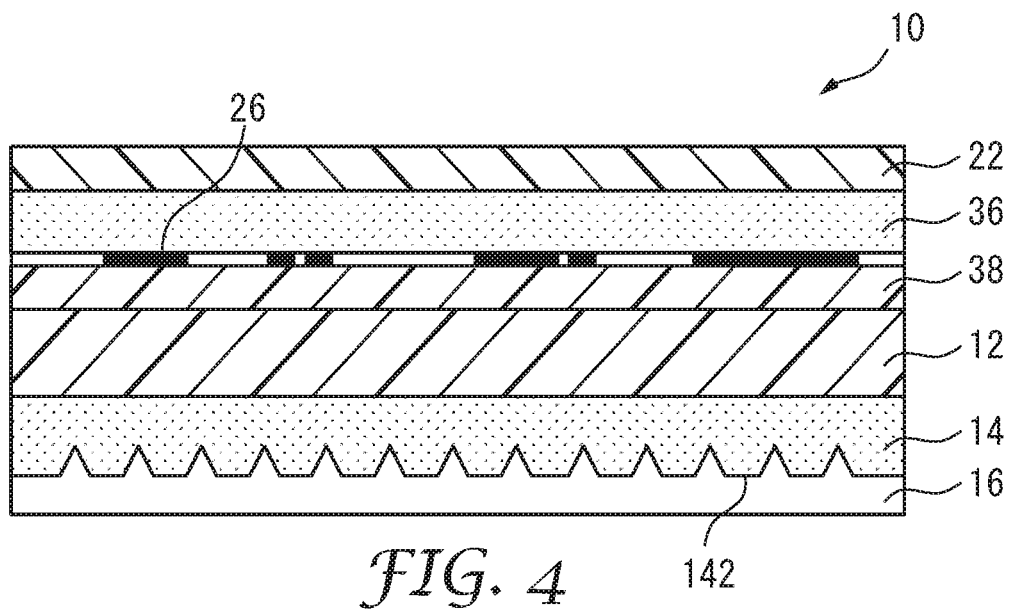
FIG. 4 is a schematic cross-sectional view of an adhesive sheet according to yet another embodiment.

FIG. 4 illustrates a schematic cross-sectional view of an adhesive sheet 10 according to yet another embodiment of the present disclosure. The adhesive sheet 10 includes a transparent resin film 22, a transparent adhesive layer 36, a graphic image 26, a receptor layer 38 that receives the graphic image 26, a rigid sheet 12, and a first pressure-sensitive adhesive layer 14. The transparent adhesive layer 36 may be the same as the second pressure-sensitive adhesive layer on condition that the transparent adhesive layer 36 is transparent.

Figure 5:
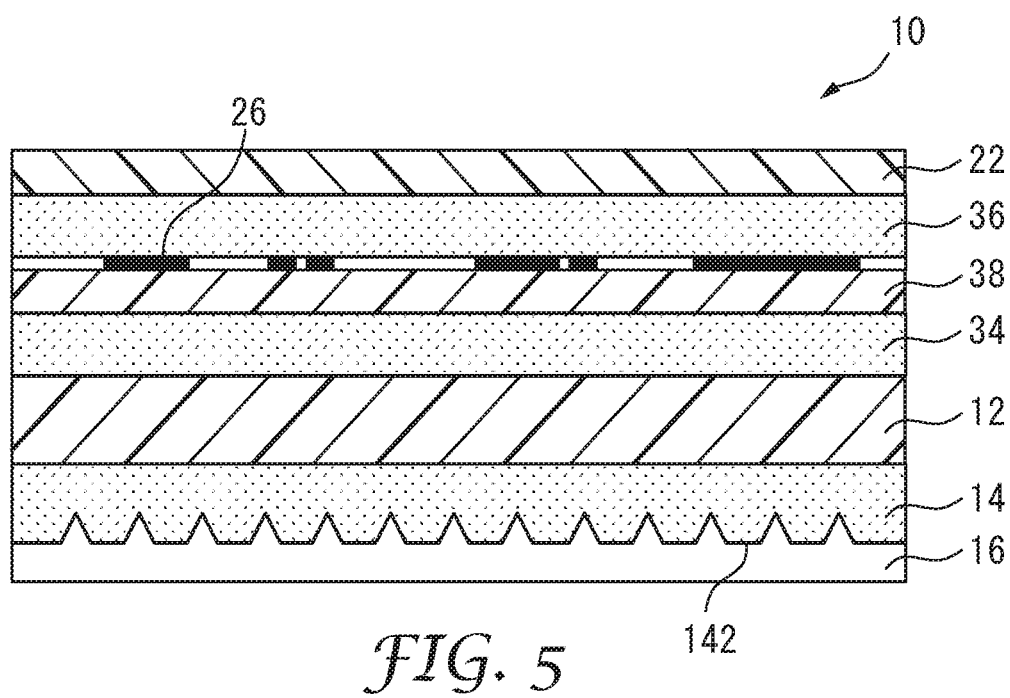
FIG. 5 is a schematic cross-sectional view of an adhesive sheet according to yet another embodiment.

FIG. 5 illustrates a schematic cross-sectional view of an adhesive sheet 10 according to yet another embodiment of the present disclosure. The adhesive sheet 10 includes a transparent resin film 22, a transparent adhesive layer 36, a graphic image 26, a receptor layer 38 that receives the graphic image 26, an adhesive layer 34, a rigid sheet 12, and a first pressure-sensitive adhesive layer 14. The adhesive layer 34 may be the same as the second pressure-sensitive adhesive layer, and may include a white pigment such as titanium oxide. The transparent adhesive layer 36 may be the same as the second pressure-sensitive adhesive layer on condition that the transparent adhesive layer 36 is transparent. The receptor layer 38 may be a transparent acrylic resin film.

The adhesive sheet may further include a metal layer. The metal layer is used, and thus, low flammability, flame retardancy or incombustibility (hereinafter collectively referred to as "incombustibility") can be imparted to the adhesive sheet. Without being bound by any theory, it is considered that since the metal layer itself has high incombustibility and can protect or shield at least some of the constituents of the adhesive sheet from flame, heat, oxygen, or the like, the adhesive sheet can be made incombustible as a whole.

The metal layer may include, for example, aluminum, an aluminum alloy, steel, a steel alloy, copper, a copper alloy, titanium, a titanium alloy, or a combination of two or more thereof. The metal layer may be a laminate of a plurality of metal layers. In an embodiment, the metal layer is used in the form of a metal foil or a metal sheet. Since aluminum or steel is easily available and has excellent incombustibility, the metal layer desirably includes aluminum or steel. Since aluminum is inexpensive and can provide practical incombustibility, the metal layer more desirably includes aluminum.

In some embodiments, the thickness of the metal layer can be about 8 μm or more, about 10 μm or greater, or about 15 μm or greater, and about 200 μm or less, about 150 μm or less, or about 100 μm or less. The thickness of the metal layer is set to about 8 μm or greater, and thus good incombustibility can be obtained. The thickness of the metal layer is set to about 200 μm or less, and thus, an unnecessary increase in a production cost for the adhesive sheet can be avoided.

When the metal layer includes aluminum, the thickness of the metal layer can be about 12 μm or greater, about 15 μm or greater, or about 25 μm or greater, and is set to about 30 μm or greater, about 40 μm or greater, or about 50 μm or greater, and thus, more excellent incombustibility can be obtained.

In an embodiment, the metal layer is disposed in direct contact or via another layer on the other surface of the rigid sheet, that is, a surface opposite to a surface in which the first pressure-sensitive adhesive layer of the rigid sheet is disposed. In this embodiment, the rigid sheet is located between the metal layer and a substrate when the adhesive sheet is applied to the substrate. Therefore, among the constituents of the adhesive sheet, the rigid sheet that has a relatively large thickness and easily burns can be protected or shielded effectively from flame, heat, oxygen, or the like due to the presence of the metal layer, and high incombustibility can be imparted to the adhesive sheet.

Figure 6:
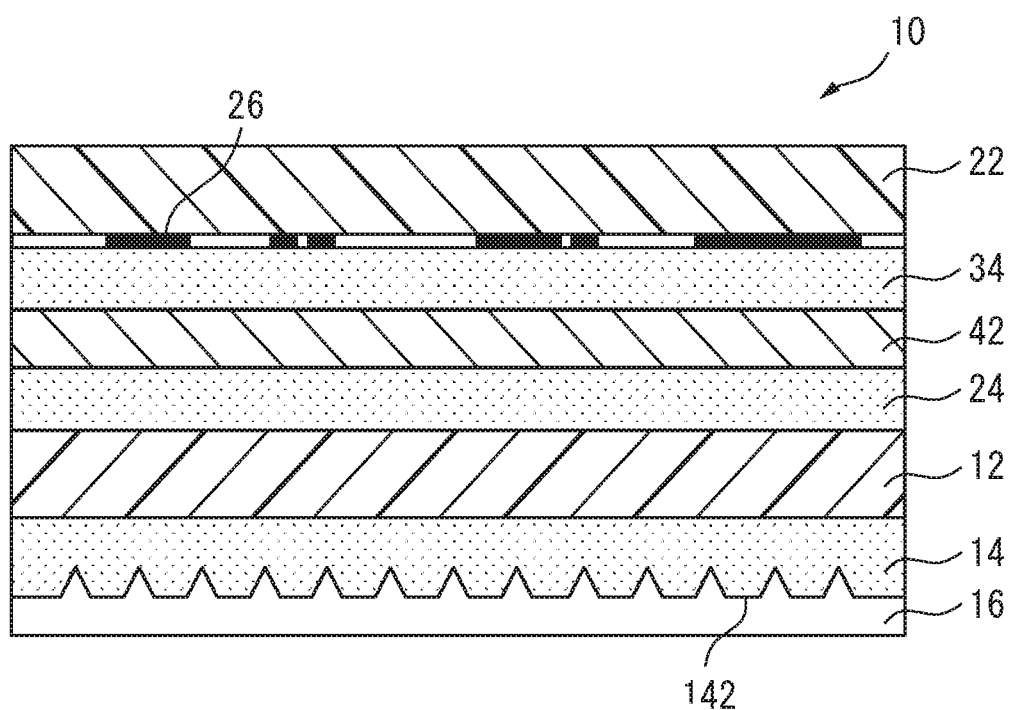
FIG. 6 is a schematic cross-sectional view of an adhesive sheet according to yet another embodiment.

FIG. 6 illustrates a schematic cross-sectional view of an adhesive sheet 10 according to yet another embodiment of the present disclosure. The adhesive sheet 10 includes a first pressure-sensitive adhesive layer 14 disposed on one surface (lower surface in FIG. 6) of a rigid sheet 12 and a metal layer 42 disposed on the other surface (upper surface in FIG. 6) of the rigid sheet 12. The metal layer 42 adheres to the rigid sheet 12 via a second pressure-sensitive adhesive layer 24. The adhesive sheet 10 further includes a transparent resin film 22 on the other surface of the rigid sheet 12, and a graphic image 26 is printed in a surface (lower surface in FIG. 6) of the transparent resin film 22. The transparent resin film 22 is caused to adhere to the metal layer 42 via an adhesive layer 34, and the graphic image 26 is located between the transparent resin film 22 and the adhesive layer 34. When the adhesive sheet 10 is applied to a substrate, the rigid sheet 12 is located between the metal layer 42 and the substrate, and thus, an outermost surface of the adhesive sheet 10 (upper surface of the transparent resin film 22 in FIG. 6) is protected or shielded by the metal layer 42 from flame, heat, oxygen, or the like to which the outermost surface is first exposed, and it is possible to prevent or suppress the spread of fire to the rigid sheet 12 that has a relatively large thickness and easily burns. The adhesive layer 34 may be the same as the second pressure-sensitive adhesive layer 24, and may include a white pigment such as titanium oxide.

In an embodiment, the adhesive layer disposed between the metal layer and a decorative layer (in FIG. 6, the adhesive layer 34 disposed between the metal layer 42 and the graphic image 26) includes a white pigment such as titanium oxide. In this embodiment, design of the decorative layer can be maintained or improved by shielding a color tone of the metal layer.

In some embodiments, a total calorific value of the adhesive sheet including the metal layer is, for example, about 10 MJ/m$^2$ or less, preferably about 8 MJ/m$^2$ or less, more preferably about 6 MJ/m$^2$ or less for 20 minutes in total. The total calorific value in the present disclosure can be measured by using a cone calorimeter method according to ISO 5660-1. According to a standard value of a fireproof material, the adhesive sheet is classified as a flame retardant material when the total calorific value is 8 MJ/m$^2$ or less for 5 minutes in total, a quasi-incombustible material when the total calorific value is 8 MJ/m$^2$ or less for 10 minutes in total, and an incombustible material when the total calorific value is 8 MJ/m$^2$ or less for 20 minutes in total.

Incombustibility of an incombustible adhesive sheet can further be enhanced by reducing the thickness of the incombustible adhesive sheet. In some embodiments, the thickness of the incombustible adhesive sheet can be about 500 μm or less, about 300 μm or less, or about 150 μm or less.

The layers constituting the adhesive sheet may contain an incombustible additive. Examples of the incombustible additive include a bromine compound, a phosphorus compound, a chlorine compound, an antimony compound, a metal hydroxide, and a nitrogen compound. As the bromine compound, pentabromodiphenyl ether, octabromodiphenyl ether, decabromodiphenyl ether (DBDPE, DBDPO), tetrabromobisphenol A (TBBPA), hexabromocyclododecane (HBCD), hexabromobenzene, and the like can be used. As the phosphorus compound, an aromatic phosphate such as triphenyl phosphate, red phosphorus, a phosphate including halogen, and the like can be used. As the chlorine compound, chlorinated paraffin and the like can be used. As the antimony compound, antimony trioxide, antimony pentoxide, and the like can be used. As the metal hydroxide, aluminum hydroxide, magnesium hydroxide and the like can be used. Melamine cyanurate and the like can be used as the nitrogen compound. A blending amount of the incombustible additive can be appropriately determined within the range in which properties desired for the adhesive sheet, such as adhesiveness, design, and transparency are not impaired.

The adhesive sheet can be used for various kinds of application and surfaces. An example includes a graphic sheet used by being pasted to a wall surface, a floor surface, a ceiling surface, or the like of a building. In particular, the adhesive sheet is useful when the adhesive sheet is applied to any of a smooth surface and a surface covered with mortar, concrete, wallpaper, or the like, and having a large degree of irregularities having irregular shapes and dimensions.

The adhesive sheet can also be suitably used as a graphic sheet for an illumination signboard. The adhesive sheet used for an illumination signboard includes a region that transmits at least a part of light from illumination located in a back surface of the adhesive sheet. The adhesive sheet is attached onto a panel of an illumination signboard made of glass, plastic, or the like, and thus, decoration that can be observed at the time of turning off and turning on of the illumination can be imparted to the illumination signboard. When the adhesive sheet has rearrangeability, it is possible to easily remove the adhesive sheet that has become unnecessary from an illumination signboard, and to paste a new adhesive sheet to the illumination signboard as necessary.

In some embodiments, a total light transmittance of the adhesive sheet can be about 5% or greater, about 7% or greater, or about 10% or greater, and about 90% or less, about 60% or less, or about 30% or less, on average, in an entire surface of the adhesive sheet.

EXAMPLES

TABLE 1

| | Composition or Description | Suppliers |
|---|---|---|
| Adhesive polymer 1 (ADH1) | Acrylic copolymer, BA-2EHA-AA = 62:32:6, Tg = −57° C., Mw = 290000, 60% by mass ethyl acetate solution | — |
| Dispersant 1 (D1) | Methacrylic copolymer, MMA-BMA-DMAEMA = 60:34:6, Tg = 63° C., Mw = 68000, 40% by mass ethyl acetate solution | — |
| Crosslinking agent 1 (CL1) | Epoxy crosslinking agent E-5XM (N,N,N',N'-tetraglycidyl-1,3-benzene di(methanamine)), 5% by mass methyl ethyl ketone solution | Soken Chemical & Engineering Co., Ltd. (Toshima-ku, Tokyo, Japan) |
| Polyester film 1 (PET1) | Cosmo Shine (trademark) A4300, thickness 188 μm, stretched polyester film | Soken Chemical & Engineering Co., Ltd. (Toshima-ku, Tokyo, Japan) |
| Polyester film 2 (PET2) | Cosmo Shine (trademark) A4300, thickness 100 μm, stretched polyester film | Soken Chemical & Engineering Co., Ltd. (Toshima-ku, Tokyo, Japan) |
| Polyester film 3 (PET3) | Cosmo Shine (trademark) A4300, thickness 75 μm, stretched polyester film | Soken Chemical & Engineering Co., Ltd. (Toshima-ku, Tokyo, Japan) |
| Polyester film 4 (PET4) | Cosmo Shine (trademark) A4300, thickness 50 μm, stretched polyester film | Soken Chemical & Engineering Co., Ltd. (Toshima-ku, Tokyo, Japan) |
| Release liner 1 (L1) | SCW1034T Comply (registered trademark) liner, surface structured single-sided silicone-treated double-sided polyethylene laminate release paper Raised part: lattice shape, height about 28 μm, interval about 1.25 mm, bottom width about 90 μm | Toyobo Co., Ltd. (Osaka-shi, Osaka, Japan) |
| Release liner 2 (L2) | SCW860DNT Comply (registered trademark) liner, surface structured single-sided silicone-treated double-sided polyethylene laminate release paper Raised part: lattice shape, height about 11 μm, interval about 0.2 mm, bottom width about 20 μm | 3M Japan Ltd. (Shinagawa-ku, Tokyo, Japan) |

TABLE 1-continued

| | Composition or Description | Suppliers |
|---|---|---|
| Release liner 3 (L3) | KPM11S, single-sided silicone-treated double-sided polyethylene laminate release paper | Lintec Corporation (Itabashi-ku, Tokyo, Japan) |
| Release liner 4 (L4) | Single-sided silicone-treated polyester liner | Mitsui Chemicals Tohcello, Inc. (Chiyoda-ku, Tokyo, Japan) |
| White pigment 1 (PG1) | Ti-Pure (trademark) R960, titanium dioxide | The Chemours Company (Wilmington, Delaware, USA) |

MMA: Methyl methacrylate
BMA: Butyl methacrylate
DMAEMA: Dimethylaminoethyl methacrylate
BA: Butyl acrylate
2EHA: 2-ethylhexyl acrylate
AA: Acrylic acid Preparation of White Adhesive A white pigment 1 (PG1), a dispersant 1 (D1) and methyl ethyl ketone were mixed to prepare a white pigment dispersion solution (premix). A mass ratio of the white pigment 1 to the dispersant 1 was 5:1 in terms of solid content. Solid content of the white pigment dispersion solution was about 66% by mass. The white pigment dispersion solution and an adhesive polymer 1 (ADH1) were mixed to prepare a white adhesive solution. In the white adhesive solution, an amount of the adhesive polymer 1 was 100 parts by mass, an amount of the white pigment 1 was 50 parts by mass, and an amount of the dispersant 1 was 10 parts by mass. A crosslinking agent 1 (CL1) was added to the white adhesive solution by an amount of 0.20 parts by mass based on 100 parts by mass of the adhesive polymer 1. Solid content of the white adhesive solution was about 55% by mass.

Example 1

The white adhesive solution was applied onto a polyester film 1 (PET1) with a knife coater. A coating layer was dried at 95° C. for 5 minutes to form a white pressure-sensitive adhesive layer having a thickness of 30 μm. The white pressure-sensitive adhesive layer was bonded to a silicone-treated surface of a release liner 4 (L4).

The same white adhesive solution was applied onto a silicone-treated surface of a release liner 1 (L1) with a knife coater. A coating layer was dried at 95° C. for 10 minutes to form a white pressure-sensitive adhesive layer having a thickness of 65 μm. The obtained white pressure-sensitive adhesive layer was laminated in an opposite surface of the polyester film 1. An irregular structure (negative structure) of the release liner 1 was transferred to the white pressure-sensitive adhesive layer, and an irregular structure (positive structure) in which a communication path having a depth of about 28 μm and a width of about 90 μm was arranged at a pitch of 1.25 mm was formed in a surface of the irregular structure. After removal of a 38 μm thick polyester liner from the white pressure-sensitive adhesive layer having a thickness of 30 μm and disposed on the polyester film 1, Scotch Cal (registered trademark) PF997 (50 μm thick acrylic film, 3M Japan Co., Ltd. (Shinagawa-ku, Tokyo, Japan)) including graphics was bonded to the white pressure-sensitive adhesive layer having a thickness of 30 μm to prepare an adhesive sheet of Example 1. A shear storage elastic modulus G' of the white adhesive at 25° C. was $3.6 \times 10^5$ Pa.

Example 2

An adhesive sheet of Example 2 was prepared in the same manner as Example 1 except that the thickness of a white pressure-sensitive adhesive layer on the release liner 1 (L1) side was changed to 100 μm.

Example 3

The white adhesive solution was applied onto a silicone-treated surface of a release liner 1 (L1) with a knife coater. A coating layer was dried at 95° C. for 10 minutes to form a white pressure-sensitive adhesive layer having a thickness of 65 μm. A polyester film 1 (PET1) was bonded to the white pressure-sensitive adhesive layer to prepare an adhesive sheet of Example 3.

Example 4

An adhesive sheet of Example 4 was prepared in the same manner as Example 3 except that the thickness of a white pressure-sensitive adhesive layer on the release liner 1 (L1) side was changed to 100 μm.

Example 5

An adhesive sheet of Example 5 was prepared in the same manner as in Example 2 except that the polyester film 1 (PET1) was changed to a polyester film 2 (PET2).

Example 6

An adhesive sheet of Example 6 was prepared in the same manner as Example 2 except that the release liner 1 (L1) was changed to a release liner 2 (L2). An irregular structure (negative structure) of the release liner 2 was transferred to a white pressure-sensitive adhesive layer, and an irregular structure (positive structure) in which a communication path having a depth of about 11 μm and a width of about 20 μm was arranged at a pitch of 0.2 mm was formed in a surface of the irregular structure.

Example 7

An adhesive sheet of Example 7 was prepared in the same manner as in Example 1 except that, instead of the white pressure-sensitive adhesive layer having a thickness of 65 μm in Example 1, a white pressure-sensitive adhesive layer having a thickness of 46 μm and formed by applying and drying the white adhesive solution onto a silicone-treated surface of a release liner 1 (L1) was laminated in a double-sided adhesive tape KRT-15 (3M Japan Co., Ltd. (Shinagawa-ku, Tokyo, Japan)) to form a pressure-sensitive adhesive layer having a thickness of 546 μm, and subsequently the layer was laminated in a surface opposite to the white pressure-sensitive adhesive layer having a thickness of 30 μm of a polyester film 1.

Example 8

An adhesive sheet of Example 8 was prepared in the same manner as in Example 7 except that, instead of the double-sided adhesive tape KRT-15, an acrylic foam double-sided adhesive tape VHB 4481MH (3M Japan Co., Ltd. (Shinagawa-ku, Tokyo, Japan)) was used to form a pressure-sensitive adhesive layer having a thickness of 1046 μm.

Example 9

An adhesive sheet of Example 9 was prepared in the same manner as Example 1 except that the thickness of a white pressure-sensitive adhesive layer on the release liner 1 (L1) side was changed to 46 μm.

Comparative Example 1

An adhesive sheet of Comparative Example 1 was prepared in the same manner as in Example 1 except that a release liner 4 (L4) was used and that a double-sided adhesive tape KRT-15 (3M Japan Co., Ltd. (Shinagawa-ku, Tokyo, Japan)) was used as a white pressure-sensitive adhesive layer.

Comparative Example 2

An adhesive sheet of Comparative Example 2 was prepared in the same manner as in Example 1 except that a release liner 4 (L4) was used and that an acrylic foam double-sided adhesive tape VHB 4481MH (3M Japan Co., Ltd. (Shinagawa-ku, Tokyo, Japan)) was used as a white pressure-sensitive adhesive layer.

Comparative Example 3

An adhesive sheet of Comparative Example 3 was prepared in the same manner as in Example 2 except that the polyester film 1 (PET1) was changed to a polyester film 3 (PET3).

Comparative Example 4

An adhesive sheet of Comparative Example 4 was prepared in the same manner as in Example 2 except that the polyester film 1 (PET1) was changed to a polyester film 4 (PET4).

Comparative Example 5

An adhesive sheet of Comparative Example 5 was prepared in the same manner as in Example 1 except that the thickness of a white pressure-sensitive adhesive layer on the release liner 1 (L1) side was changed to 30 μm.

Comparative Example 6

An adhesive sheet of Comparative Example 6 was prepared in the same manner as in Example 1 except that the release liner 1 (L1) was changed to a release liner 3 (L3).

The pressure-sensitive adhesive layers, the rigid sheets and the adhesive sheets were tested and evaluated by the following procedures.
Yield Elastic Modulus The polyester film was cut into a rectangle having a width of 15 mm and a length of 100 mm to prepare a test piece. An elongation characteristic of the test pieces was measured in accordance with JIS K 7127: 1999 by using a tensile tester (Tensilon universal tester, Model No.: RTC-1210A, A & D Co., Ltd. (Toshima-ku, Tokyo, Japan)) under conditions of: 20° C., a gripping interval of 50 mm and a tensile speed of 300 mm/min. An elastic modulus at a yield point was taken as a yield elastic modulus.
2% Tensile Strength The resin film was cut into a rectangle having a width of 25 mm and a length of 100 mm to prepare a test piece. Tensile strength at 2% elongation at 20° C. was measured by using a tensile tester (Tensilon universal tester, Model No.: RTC-1210A, A & D Co., Ltd. (Toshima-ku, Tokyo, Japan)) under conditions of: 20° C., a gripping interval of 50 mm and a tensile speed of 300 mm/min.
Visual Appearance (Smoothness)

The adhesive sheet was cut into about 150 mm square to prepare a test piece. The test piece was pasted onto a stucco-coated panel (Paltec Co., Ltd., Hiratsuka City, Kanagawa, Japan) at 23° C. by using a roller. The stucco-coated panel onto which the test piece was pasted was held vertically at 23° C. for 48 hours. When a surface of the test piece on a substrate was flat visually, visual appearance was determined as "good." When the surface of the test piece on the substrate looked rough visually, visual appearance was determined as "poor." When peeling of the test piece on the stucco-coated panel was able to be confirmed visually, visual appearance was determined as "unacceptable."
Adhesive Force A test piece was cut into a rectangle having a width of 25 mm and a length of 150 mm to prepare a test piece. The test piece was pasted at 23° C. onto a melamine-coated panel, a mortar panel, and a DI-NOC (registered trademark) PS959 film (matt surface processing, surface roughness: 50 μm, 3M Japan Co., Ltd., Shinagawa-ku, Tokyo, Japan). A pasting method conformed to JIS Z 0237: 2009. The test piece was left at 20° C. for 24 hours. Adhesive force obtained when 180° peeling was performed at 20° C. and a peeling rate of 300 mm/min by using a tensile tester (Tensilon universal tester, Model No.: RTC-1210A, A & D Co., Ltd. (Toshima-ku, Tokyo, Japan)) was measured.
Air Release The adhesive sheet was cut into about 150 mm square to prepare a test piece. The test piece was pasted onto a melamine-coated panel (Paltec Co., Ltd., Hiratsuka City, Kanagawa, Japan) at 23° C. by using a roller. When no air bubble was observed at an interface between a substrate and the test piece, air release was determined as "good." When air bubbles were observed at the interface between the substrate and the test piece, air release was defined as "poor."
Removability from DI-NOC (Trade Name) Film A test piece was cut into a rectangle having a width of 25 mm and a length of 150 mm to prepare a test piece. The test piece was pasted onto a DI-NOC (trade name) PS959 film at 23° C. by using a roller. The test piece was left at 23° C. for 48 hours. In a case where a pressure-sensitive adhesive residue could not be confirmed on the DI-NOC (trade name) PS959 film when the test piece was removed, removability was determined as "excellent." In a case where the pressure-sensitive adhesive residue was slightly confirmed on the DI-NOC (trade name) PS959 film, but could be cleaned easily by using isopropanol, removability was determined as "good." In a case where the test piece was difficult to remove from the DI-NOC (trade name) PS959 film, removability was determined as "poor," "Excellent" and "good" are practically acceptable. Surface roughness of the DI-NOC (trade name) PS959 film was about 50 μm.

Removability from Mortar Panel

A test piece was cut into a rectangle having a width of 25 mm and a length of 150 mm to prepare a test piece. The test piece was pasted onto a mortar panel (Paltec Co., Ltd., Hiratsuka City, Kanagawa, Japan) at 23° C. by using a roller. The test piece was left at 23° C. for 48 hours. In a case where a pressure-sensitive adhesive residue could not be confirmed on the mortar panel when the test piece was removed, removability was determined as "excellent." In a case where the pressure-sensitive adhesive residue was slightly confirmed on the mortar panel, but could be cleaned easily by using isopropanol, removability was determined as "good." In a case where the test piece was difficult to remove from the mortar panel, removability was determined as "poor." "Excellent" and "good" are practically acceptable.

Details and evaluation results of the prepared adhesive sheets are shown in Table 2. In Table 2, items not evaluated are indicated as ND.

TABLE 2

| | Rigid sheet | | | | | | |
|---|---|---|---|---|---|---|---|
| | Type | Thickness (μm) | Yield elastic modulus (MPa) | Yield elastic modulus × thickness (× $10^4$ N/m) | 2% Tensile strength (N/25 mm) | Release liner | Pressure-sensitive adhesive layer (μm) |
| Example 1 | PET1 | 188 | 115 | 2.16 | 347 | L1 | 65 |
| Example 2 | PET1 | 188 | 115 | 2.16 | 347 | L1 | 100 |
| Example 3 | PET1 | 188 | 115 | 2.16 | 347 | L1 | 65 |
| Example 4 | PET1 | 188 | 115 | 2.16 | 347 | L1 | 100 |
| Example 5 | PET2 | 100 | 111 | 1.11 | 186 | L1 | 100 |
| Example 6 | PET1 | 188 | 115 | 2.16 | 347 | L2 | 100 |
| Example 7 | PET1 | 188 | 115 | 2.16 | 347 | L1 | 546 |
| Example 8 | PET1 | 188 | 115 | 2.16 | 347 | L1 | 1046 |
| Example 9 | PET1 | 188 | 115 | 2.16 | 347 | L1 | 46 |
| Comparative Example 1 | PET1 | 188 | 115 | 2.16 | 347 | L4 | 500 |
| Comparative Example 2 | PET1 | 188 | 115 | 2.16 | 347 | L4 | 1000 |
| Comparative Example 3 | PET3 | 75 | 111 | 0.83 | 156 | L1 | 100 |
| Comparative Example 4 | PET4 | 50 | 116 | 0.58 | 109 | L1 | 100 |
| Comparative Example 5 | PET1 | 188 | 115 | 2.16 | 347 | L1 | 30 |
| Comparative Example 6 | PET1 | 188 | 115 | 2.16 | 347 | L3 | 65 |

| | | Adhesive force (N/25 mm) | | | Removability | |
|---|---|---|---|---|---|---|
| | Visual appearance (smoothness) | Coated panel | Mortar | DI-NOC (registered trademark) | Air release | DI-NOC (registered trademark) | Mortar |
| Example 1 | Good | 4 | 8 | 5 | Good | Excellent | Excellent |
| Example 2 | Good | 5 | 16 | 13 | Good | Excellent | Excellent |
| Example 3 | Good | 3 | 10 | 6 | Good | Excellent | Excellent |
| Example 4 | Good | 8 | 18 | 17 | Good | Excellent | Excellent |
| Example 5 | Good | ND | ND | ND | Good | Excellent | Excellent |
| Example 6 | Good | 4 | 20 | 27 | Good | Excellent | Excellent |
| Example 7 | Good | 17 | 50 | 37 | Good | Excellent | Excellent |
| Example 8 | Good | 45 | 106 | 107 | Good | Excellent | Excellent |
| Example 9 | Good | 3 | 11 | 6 | Good | Excellent | Excellent |
| Comparative Example 1 | Good | 13 | 1 | 3 | Poor | Excellent | Excellent |
| Comparative Example 2 | Good | 28 | 78 | 72 | Poor | Poor | Poor |
| Comparative Example 3 | Poor | ND | ND | ND | Good | Excellent | Excellent |
| Comparative Example 4 | Poor | ND | ND | ND | Good | Excellent | Excellent |
| Comparative Example 5 | Unacceptable | ND | ND | ND | Good | Excellent | Excellent |
| Comparative Example 6 | Good | ND | ND | ND | Poor | Excellent | Excellent |

REFERENCE SIGNS LIST

10 Adhesive sheet
12 Rigid sheet
14 First pressure-sensitive adhesive layer
142 Microstructured surface
16 Liner
22 Transparent resin film
24 Second pressure-sensitive adhesive layer
26 Graphic image
32 Additional resin film layer
34 Adhesive layer
36 Transparent adhesive layer
38 Receptor layer
42 Metal layer

The invention claimed is:

1. An adhesive sheet comprising:
a rigid sheet having a thickness of 80 μm or greater and 2 mm or less and a yield modulus of 10 MPa or greater and 300 MPa or less, wherein a product of the yield modulus and the thickness of the rigid sheet is $0.9 \times 10^4$ N/m or greater and $5 \times 10^4$ N/m or less; and
a first pressure-sensitive adhesive layer disposed on one surface of the rigid sheet, the first pressure-sensitive adhesive layer having a thickness of 40 μm or greater and 1.2 mm or less and including a microstructured surface including irregularities, wherein the first pressure-sensitive adhesive layer is free of microspheres.

2. The adhesive sheet according to claim 1, further comprising a transparent resin film including a graphic image printed in a surface of the transparent resin film.

3. The adhesive sheet according to claim 2, further comprising a second pressure-sensitive adhesive layer in the other surface of the rigid sheet.

4. The adhesive sheet according to claim 2, wherein the transparent resin film is the rigid sheet.

5. The adhesive sheet according to claim 1, wherein the first pressure-sensitive adhesive layer has a shear storage elastic modulus G' at 25° C. of $5 \times 10^4$ Pa or greater and $1 \times 10^6$ Pa or less.

6. The adhesive sheet according to claim 1, wherein the rigid sheet has 2% tensile strength of 40 N/25 mm or greater.

7. The adhesive sheet according to claim 1, wherein the rigid sheet is a polyester film.

8. The adhesive sheet according to claim 1, wherein the microstructured surface of the first pressure-sensitive adhesive layer includes a convex part and a concave part surrounding the convex part.

9. The adhesive sheet according to claim 8, wherein the convex part and the concave part form a communication path having a width of 5 μm or greater and 100 μm or less.

10. The adhesive sheet according to claim 8, wherein the convex part and the concave part form a communication path having a depth of 10 μm or greater and 400 μm or less.

11. The adhesive sheet according to claim 1, further comprising a liner disposed on the first pressure-sensitive adhesive layer, the liner including a microstructured surface complementary to the microstructured surface of the first pressure-sensitive adhesive layer.

12. The adhesive sheet according to claim 1, wherein the first pressure-sensitive adhesive layer includes an acrylic adhesive.

13. The adhesive sheet according to claim 1, wherein the first pressure-sensitive adhesive layer includes a white pigment.

14. The adhesive sheet according to claim 1, further comprising a metal layer.

15. The adhesive sheet according to claim 1, wherein the microstructured surface of the first pressure-sensitive adhesive layer comprises a predetermined pattern.

16. The adhesive sheet according to claim 1, wherein the microstructured surface of the first pressure-sensitive adhesive layer comprises a communication path of a regular pattern.

* * * * *